Oct. 22, 1968     R. W. MacCARTHY     3,406,448
CIRCULAR BLADE RAZOR WITH TOOTHED BACK-UP RING
HAVING RELATIVE ROTATIVE AND
OSCILLATIVE MOVEMENT
Filed May 31, 1967     2 Sheets-Sheet 1
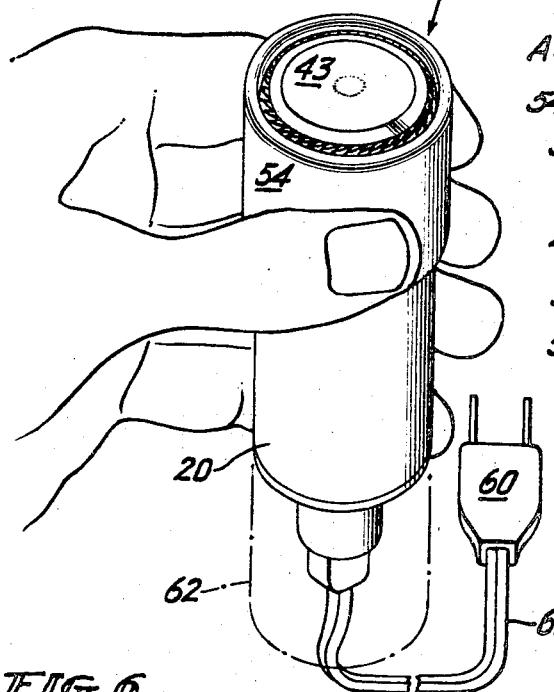
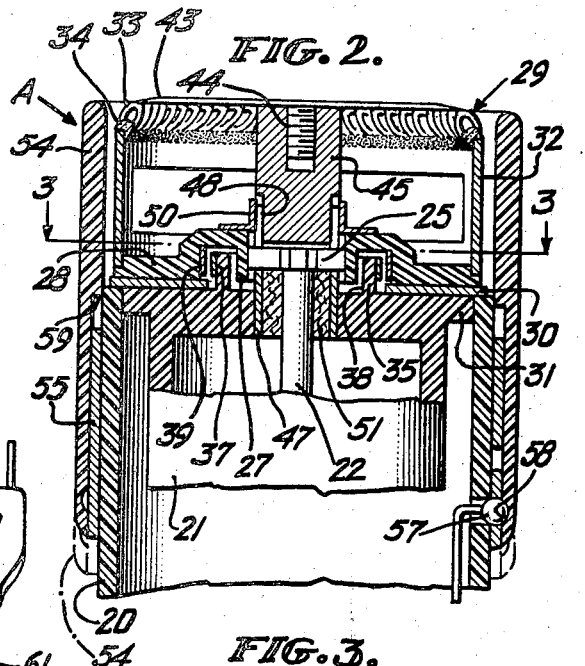
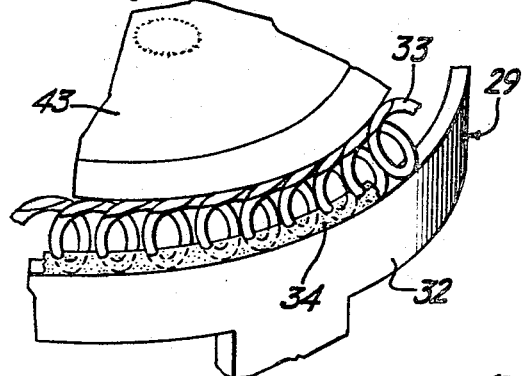
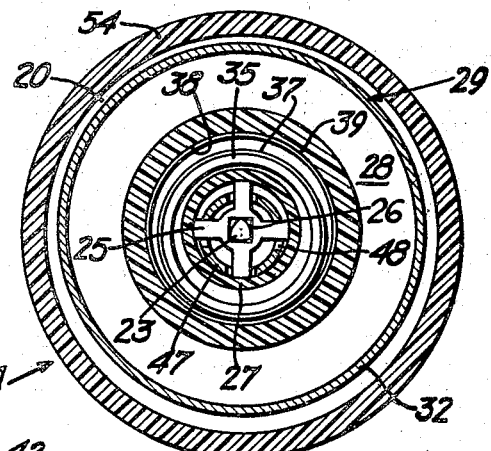
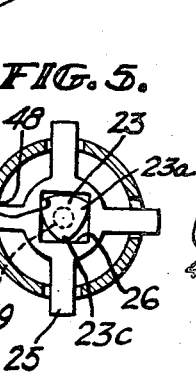
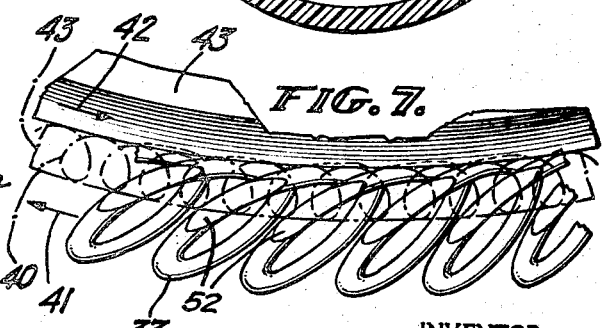
INVENTOR.
RICHARD W. MACCARTHY
BY
Thomas D. Lane
ATTORNEY.

Oct. 22, 1968
R. W. MacCARTHY
3,406,448
CIRCULAR BLADE RAZOR WITH TOOTHED BACK-UP RING
HAVING RELATIVE ROTATIVE AND
OSCILLATIVE MOVEMENT
Filed May 31, 1967
2 Sheets-Sheet 2
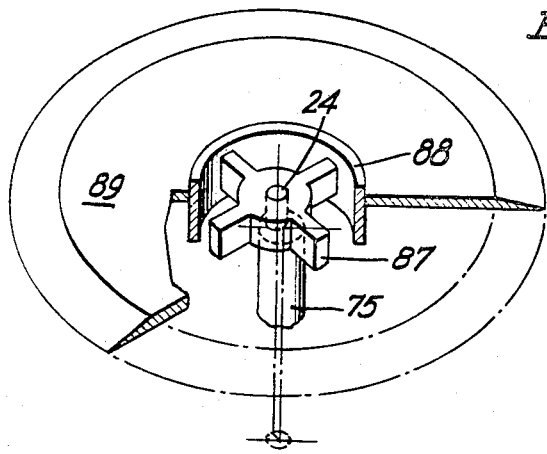
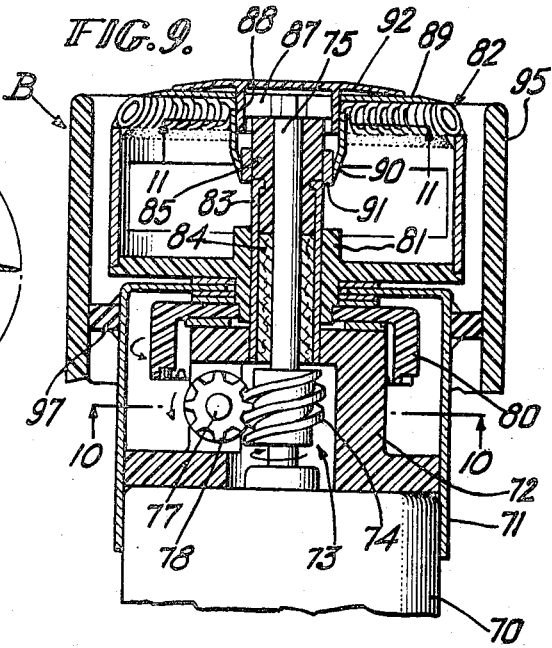
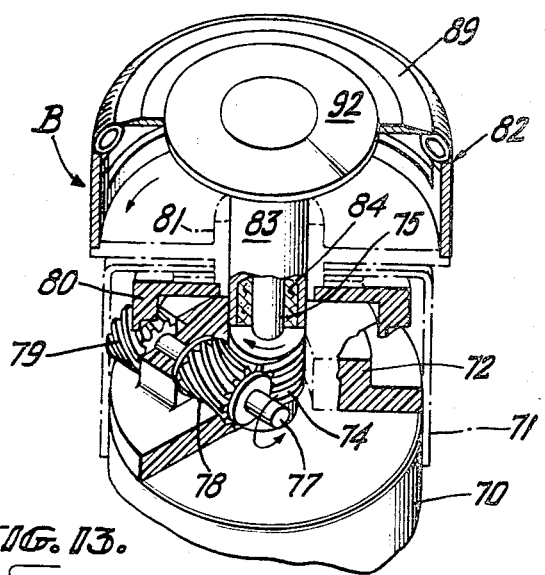
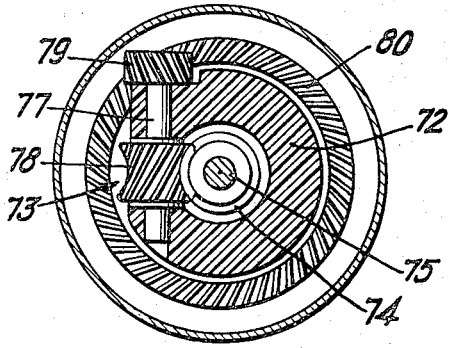
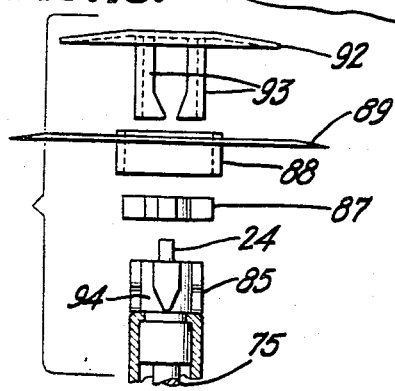
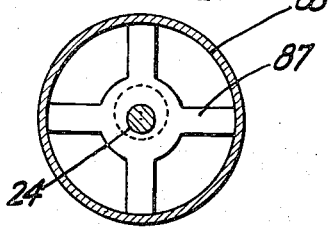
INVENTOR.
RICHARD W. MAC CARTHY
BY
Thomas D. Paul
ATTORNEY.

… … …

United States Patent Office 3,406,448
Patented Oct. 22, 1968

3,406,448
CIRCULAR BLADE RAZOR WITH TOOTHED BACK-UP RING HAVING RELATIVE ROTATIVE AND OSCILLATIVE MOVEMENT
Richard W. MacCarthy, Los Gatos, Calif.
(1445 Calaveras Ave., San Jose, Calif. 95126)
Filed May 31, 1967, Ser. No. 642,429
7 Claims. (Cl. 30—43.8)

ABSTRACT OF THE DISCLOSURE

A small electric motor is mounted in a hand-held housing and a circular blade is mounted on one end of the housing. A toothed back-up ring is mounted co-axially of, and in light, conforming contact with, a marginal portion of the blade. In one illustrative form of the invention the motor is operatively connected to oscillate the back-up ring in recurring small, circular orbits. This oscillative movement of the back-up ring, by means of an epicyclic drive mechanism, also simultaneously rotates the back-up ring. In the other illustrative form of the invention the circular blade is oscillated in recurring small circular orbits and the toothed back-up ring is rotatively driven by a worm gear and pinion. In both illustrative forms of the invention the teeth of the blade back-up ring are inclined with a forward rake with respect to the direction of relative rotation between the blade and the back-up ring, and the radially inward edges of the teeth are sharpened to a cutting edge, so that whiskers encountered by the rotating ring of teeth are urged, cam-like, into the cutting zone between the edge of the blade and the teeth, where the relative oscillative movement between the blade and the back-up ring alternately moves the peripheral cutting edge of the circular blade radially outwardly across the inclined, radially inwardly directed cutting edges of the teeth of the back-up ring, thereby to exert a combined slicing, shearing action which severs the whiskers interposed therebetween at the skin level, and then moves said cutting edge of the blade radially inwardly preparatory to the next cutting stroke.

---

A razor having a circular blade sharpened peripherally to a keen slicing edge is pressed lightly into conforming relation with a back-up ring comprising an annulus of teeth, each of the teeth being inclined at a rake-angle to a radius through the tooth, the blade and/or the annulus of teeth or both being relatively rotatively driven at a selected speed, while at the same time at least one thereof is oscillated at a high speed relative to their rate of relative rotation.

The present invention is an improvement on my U.S. Patents No. 3,220,108, issued Nov. 30, 1965, and No. 3,298,101, issued Jan. 17, 1967, and pending application Ser. No. 473,923, filed July 22, 1965 which has matured into Patent No. 3,349,483 granted Oct. 31, 1967.

The invention will be apparent from the following description and the accompanying drawings, wherein:

FIG. 1 is a perspective view of a razor embodying the invention as it appears when held in the hand of a user, a battery-charger unit to replace the extension cord being shown in dash-dot lines.

FIG. 2 is an enlarged, fragmentary, longitudinal, diametrical, sectional view through the upper portion of the razor as shown in FIG. 1.

FIG. 3 is a sectional view taken along line 3—3 of FIG. 2.

FIG. 4 is a fragmentary, side elevational view showing the axial assembly at the upper end of FIG. 2, a fragment of the blade being shown.

FIG. 5 is a sectional view taken along line 5—5 of FIG. 4.

FIG. 6 is a further enlarged, fragmentary perspective view showing approximately a quadrant of the blade and back-up ring.

FIG. 7 is a still further enlarged fragment of the blade and back-up ring, the solid line showing the blade edge at its inward limit of oscillative movement relative to the teeth of the back-up ring, the dash-dot line showing it at its outward limit, and the spiral broken line showing the path of movement of a point on the blade edge during use.

FIG. 8 is a fragmentary, perspective view of the blade and oscillating elements of a modified form of the invention.

FIG. 9 is a longitudinal, diametrical sectional view of the upper portion of the modified form of the invention shown in FIG. 8.

FIG. 10 is a sectional view taken along line 10—10 of FIG. 9.

FIG. 11 is an enlarged sectional view taken along line 11—11 of FIG. 9.

FIG. 12 is a fragmentary perspective view of the portion of the razor shown in FIG. 9.

FIG. 13 is an exploded view of the portion of the parts comprising the axial structure at the upper end of FIG. 9, the resilient sealing sleeve being omitted.

Referring to the drawings in detail, and considering first the form of the invention shown in FIGS. 1–6, a razor A embodying the invention comprises a cylindrical housing 20 having a conventional drive motor 21 with the drive shaft 22 thereof disposed axially of the housing and driven to rotate at a desired speed. An eccentric drive stud 23 is provided on the end of the motor shaft 22, and preferably is of the novel type shown in FIG. 5, although if desired a conventional eccentric drive pin such as that 24 shown in FIGS. 8, 11 and 13 may be employed.

The eccentric drive means shown in FIG. 5 comprises the triangular stud 23 projecting co-axially from the end of the motor shaft 22 and rotating within a square hole 26 in a cross-shaped eccentric drive member 25. The sides of the triangular stud 23 are rounded convexly slightly on curves which will maintain three circumferentially discrete portions of the triangular drive stud 23 in substantially constant contact with three circumferentially discrete portions of the sides defining the square hole 26 in the cross 25 during rotation of the motor shaft 22. This action oscillates the non-rotating cross-shaped member 25 in a circular orbit at a speed three times that of the triangular stud 23, and in the reverse direction from that of rotation of the shaft 22 and its stud 23.

The manner of causing this oscillation of the cross member 25 in the reverse direction to, and at three times the speed of, shaft rotation can be readily visualized with reference to FIG. 5. The cross member 25 is held against rotative movement about its own axis while being free for oscillation in a limited circular orbit in a manner to be described later herein. Assume that the motor shaft 22 and the triangular stud 23 fixedly mounted co-axially thereon are rotating clockwise as shown in FIG. 5. With the stud 23 positioned in the square hole 26 in the cross 25 as shown in FIG. 5, the lowermost lobe 23c of the stud 23 holds the cross 25 in its lowermost position, while the other two lobes 23a and 23b center the axis of the cross between them at the bottom of the broken-line circle 49 which represents the oscillative orbit of the axis of the cross 25. As the triangular stud 23 rotates from this position of FIG. 5 in a clockwise direction, the lobe 23a swings downwardly and toward the right from its position in FIG. 5, lobe 23b swings upwardly and toward the right, and lobe 23c moves upwardly and toward the left. Thus, the axis of the cross 25 is moved from its lowermost, centered position on the broken-line circle 45 upwardly and toward the right in a counterclockwise orbit. When the lobe 23a passes a position directly to the right of the axis of its triangular stud 23 it continues to swing down, but now swings toward the left, while the lobe 23b continues to swing upwardly and toward the right until it is directly above the axis of the stud 23. The lobe 23c, during this portion of the cycle, by swinging toward the left and upwardly urges the cross 25 toward the left, and permits upward movement of the cross by the lobe 23b, thereby continuing its counter-clockwise oscillative orbit. By the time the lobe 23b is in its uppermost, centered position, the two lobes 23a and 23c will be at equal distances on each side of the axis of the stud 23, so that the axis of the cross will then have completed 180° of its counter-clockwise orbit and will be at the top center of the broken-line circle 49. Meanwhile, stud 23 will have rotated only ⅙ of a revolution, or 60°. As the stud 23 continues its clockwise rotation, and the lobe 23b swings around another 60° to the position shown occupied by lobe 23a in FIG. 5, the stud 23 will have completed ⅓ of a revolution, while the cross 25 will have completed the other half of its orbit indicated by the broken-line circle 49. Thus, for each ⅓ of a revolution of the stud 23, the cross 25 will have been oscillated through one complete orbit in the opposite direction.

The cross-shaped member 25 as shown in FIGS. 2 and 3 is fitted into the axial opening of the hub 27 of the annular base portion 28 of a blade back-up ring 29, and this base portion 28 is mounted for free, slidable, oscillating movement on a low-friction support washer 30, which may be of Teflon. The washer 30 rests on the head 31 of the motor housing 20. A cylindrical rim 32 is secured co-axially to the periphery of the base portion 28, and a helical coil of wire 33 formed into an annulus is mounted co-axially on the upper edge of the cylindrical rim 32 as by being embedded in a layer of epoxy resin 34 (FIG. 6).

An upstanding annular flange 35 is provided co-axially on the upper end of the motor housing 20 and a layer 37 of high-friction material, such as rubber, is applied exteriorly to this rim. This flange 35 is inserted in an annular groove 38 provided co-axially in the under side of the back-up ring base portion 28, and the radially outward face of this groove is lined with a layer 39 of high friction material. The difference between the outer diameter of the flange 35 and the outer wall of the groove 38 is such that the eccentricity of the blade back-up ring 29 as determined by the oscillative means will retain the two layers of high-friction material 37 and 39 in driving contact with each other as the back-up ring 39 is oscillated through successive orbits by rotation of the oscillative drive stud 23 (FIG. 5), thereby producing an epicyclic rotative driving effect on the back-up ring 29. This action is shown diagrammatically in FIG. 7, where the broken spiral line 40 indicates the rotative and oscillative progress of a point on the edge of the blade relative to the back-up ring during operation of the drive motor. The outer arrow 41 and inner arrow 42 indicate relative rotative movement between the circular blade 43 and the back-up ring 29 regardless of whether it is the blade, or the back-up ring, or both which rotate. In the form of the invention shown in FIGS. 1–6 the back-up ring 29 is both oscillated and rotated, while the blade is stationary and this is the presently preferred form of the invention.

The blade 43 is a thin disk of suitable razor blade steel, with a blade mounting screw 44 affixed co-axially thereto. The blade mounting screw 44 is screwed into a support post 45 which is secured co-axially in the end of a tube 47 fixedly inserted in a hole provided therefor co-axially of the upper end of the motor housing 20.

Four slots 48 (FIGS. 2, 4 and 5) are provided in the stationary tube 47 to admit the four arms of the cross 25 with sufficient clearance to permit oscillation of the cross about its orbit when actuated by the triangular stud 23 (FIG. 5). The size of this orbit is indicated by the broken line circle 49 in FIG. 5.

A flanged collar 50 (FIG. 2) is fitted onto the tube 47, and rides lightly on the hub 27 of the blade back-up ring 29 to provide a whisker seal at this point, and an oil wick 51 is fitted into the tube 47 below the cross 25.

The radially inclined or forwardly raked teeth of the illustrative blade back-up ring 29 are formed by grinding a surface 52 on each convolution of the wire coil 33, all of which surfaces define a common surface upon which a marginal portion of the blade 43 rides. The structural details of this type of blade back-up ring are set forth in my U.S. Patent No. 3,298,101. However, the present invention is not limited to any specific type of blade back-up ring, and others, such as for example, those shown in my U.S. Patent No. 3,220,108 may be used.

A stretcher ring 54 comprises a cylindrical sleeve fitted for axial slidable adjustment over a sleeve 55 of medium friction material applied around the motor housing 20. A spring detent 57 mounted in the housing engages a groove 58 in the stretcher ring to gauge its advanced, operative position as shown in solid lines in FIG. 1, while a shoulder 59 limits its retracted position.

The operation of the razor A shown in FIGS. 1–6 is as follows:

With the razor blade 43 screwed into position to ride lightly on the ground surfaces 52 of the back-up ring 29 as shown in FIGS. 1 and 2, the drive motor 21 is energized, either by connecting the plug 60 of a usual conductor cord 61 into a usual wall socket (not shown) or by means of batteries (not shown) housed in an extension 62 of the motor housing as shown in broken lines in FIG. 1. Energization of the motor causes the motor shaft 22 and its integral triangular stud 23 (FIG. 5) to rotate, and thereby to oscillate the cross 25, in recurring circular orbits. The cross 25, fitted into the hub of the back-up ring, oscillates the back-up ring in similar orbits.

This oscillation of the back-up ring, by means of the epicyclic driving effect on the blade back-up ring described previously herein, causes the back-up ring to rotate in the same direction as its orbit of oscillation. The speed of rotation of the back-up ring, in accordance with the well-known principles of epicyclic drives, can be increased by decreasing the radius of the flange 35 and correspondingly increasing the "throw" of the eccentric drive means sufficiently to maintain driving contact between the flange 35 and the outer face of the groove 38. The relative proportions of the various parts as illustrated in the drawings are satisfactory.

With the motor shaft 22 rotating at a speed of approximately 1200 r.p.m. and using the oscillative drive mechanism shown in FIG. 5, the oscillative speed of the back-up ring will be 3600 orbits per minute and the rotative speed of the back-up ring will be approximately 150 r.p.m. In using the eccentric drive pin mechanism of FIG. 11 the motor speed preferably is 3600, in which case the oscillative speed of the back-up ring will be 3600 orbits per minute, and its rotative speed still approximately 150 r.p.m.

It is desirable to have the blade back-up ring 29 oscillate rapidly so as to provide a rapid movement of the keen, peripheral slicing edge of the blade toward and away from the radially inclined teeth of the back-up ring to provide an effective slicing, shearing effect on whiskers coming therebetween. However, the back-up ring preferably should rotate at a speed only sufficient to have the forwardly raked teeth thereof engage the whiskers, erect them, and present them to the blade edge for severing, and not fast enough to irritate or injure the skin of the user's face. Tests are still being conducted in an attempt to find the most effective and comfortable speed ranges. While many existing dry shavers do not operate satisfactorily in hot, humid climates, the razor of the present invention operates just as well under such conditions as in a dry temperature climate.

In the modified form B of the invention shown in FIGS. 8–13, a drive motor 70 is mounted in a housing 71 having a gear chamber 72 formed in its upper end to house gearing 73 comprising a worm drive pinion 74 secured co-axially on the motor drive shaft 75. A transverse shaft 77 is journaled in the wall of the chamber 72, and a worm gear 78 thereon is in driven, meshed relation with the worm pinion 74.

A pinion 79 on an end of the shaft 77 is in driving, meshed relation with a cup-shaped gear 80, which is secured co-axially on a downward extension of the hub 81 of the base of the back-up ring 82. The hub 81 is journalled to rotate on a mteal tube 83, which is fixedly mounted co-axially of the motor shaft in a hole provided therefor in the gear chamber 72. An oil wick 84 is provided in the tube 82, and a bushing is fitted into the upper end of the tube 83. The eccentric drive stud 24 (FIGS. 8, 11 and 13) is provided on the upper end of the motor shaft 75, and is journaled in a hole provided therefor axially of a cross-shaped oscillative drive member 87. The cross 87 rides in a sleeve 88 mounted co-axially of the circular blade 89, so that upon rotation of the motor shaft 75 the blade 89 will be oscillated in a circular orbit by the cross, while the blade back-up ring is simultaneously slowly rotated about its axis by the gearing 73.

A flexible sleeve 90 which may be of softly resilient rubber, is mounted on the blade sleeve 88 and engages a collar 91 on the upper end of the bushing 85 to seal out whiskers severed during shaving.

To retain the blade 89 in lightly pressed engagement with the back-up ring 82 a blade cap 92, FIGS. 9, 12 and 13, which may be of molded nylon, fits over the sleeve 88 and the central area of the blade, and four fingers 93 having widened end portions are inserted through the sleeve 88 and fit into correspondingly shaped grooves 94 formed to receive them in the upper end of the bushing 85. When these fingers are fitted into their corresponding grooves the cap 93 is in light bearing contact with the blade 89 when the latter is in contact with the teeth of the back-up ring.

A stretcher ring sleeve 95 is mounted for axial slidable adjustment on a ring 97 of rubber or other suitable medium friction material secured around the motor housing.

The operation of the razor B (FIGS. 8–13) will be obvious to one having read the description herein of the operation of the razor A shown in FIGS. 1–6.

The invention provides a positive, high-speed shearing-slicing effect as the short slicing edge of the blade is relatively advanced toward and withdrawn from the positively raked or radially inclined teeth of the back-up ring, while the relative rotation of the back-up ring tends to erect the whiskers and present them to the cutting edge of the blade for severing.

While I have illustrated and described a preferred embodiment of the present invention, and one modification thereof, it will be understood, however, that various changes and modifications may be made in the details thereof without departing from the scope of the invention as set forth in the appended claims.

I claim:

1. A circular blade razor with combined slicing-shearing action comprising
   a hand held housing,
   a blade back-up ring of teeth on the housing facing axially outwardly, each tooth being inclined relative to a radius through the tooth,
   a surface formed on the axially outward side of each tooth of the ring of teeth, said surfaces on all of the teeth defining a common surface of revolution co-axial with the ring of teeth,
   a shearing edge on each of the teeth at said surface, inclined in a selected rotative direction and facing angularly inwardly relative to the axis of the ring of teeth,
   a circular blade having the periphery thereof sharpened to a cutting edge mounted on the axially outward side of the ring of teeth with a marginal portion of the axially inward side of the blade conforming with said common surface, and
   means for oscillating the blade and the back-up ring relatively to each other in a direction to alternately advance the peripheral edge of the blade radially outwardly transversely across, and to retract the blade edge radially inwardly across the inclined shearing edges of the teeth, thereby to sever whiskers interposed between the inclined edges of the teeth and the blade edge.

2. A circular blade razor as defined in claim 1, wherein the blade and back-up ring are driven rotatively relative to each other in a direction to cause the inclined shearing edges of the teeth to have a positive rake.

3. A circular blade razor as defined in claim 1 wherein the blade is retained against rotation and the back-up ring is rotatively driven at a slow speed relative to the speed of relative oscillation of the blade and back-up ring.

4. A circular blade razor as defined in claim 1 wherein the relative oscillation between the blade and the back-up ring is attained by providing a square hole in a cross-shaped member which in turn is fitted co-axially to the back-up member over a triangular, motor-driven cam, the size of the triangular cam and the shape of the sides thereof being such as to maintain three circumferentially discrete portions of the cam in substantially constant contact with the sides defining the square hole during rotation of the cam, thereby oscillating the cross and the back-up ring at an orbital speed three times the rotative speed of the triangular cam, and in the opposite direction thereto.

5. A circular blade razor as defined in claim 1 wherein the diameter of the surface of revolution on the teeth is at least as great as the diameter of the circular blade plus the diameter of the orbit of oscillation.

6. A circular blade razor as defined in claim 1 wherein the relative oscillation between the blade and the back-up ring is attained by providing a hole in an element of one of the latter members over an eccentric pin extending endwise from a rotatable power driven member.

7. A circular blade razor as defined in claim 3 wherein an outwardly facing annular surface on an element secured to the back-up ring is driven to oscillate in an orbit within, and in constant driving contact with, an inwardly facing annular surface on an element secured to the housing, thereby providing epicyclic drive mechanism for rotatively driving the back-up ring, the difference in diameter between the two annular surfaces being small relative to their diameter so that the rate of rotation of the back-up member is slow relative to the orbital speed of oscillation of the element secured to the back-up ring.

References Cited

UNITED STATES PATENTS

| | | | |
|---|---|---|---|
| 2,134,609 | 10/1938 | Hay | 30—43.2 |
| 2,167,833 | 8/1939 | Gold | 30—43.5 |
| 2,194,815 | 3/1940 | Testi | 30—43.1 |
| 2,220,800 | 11/1940 | Jepson | 30—43.5 |
| 2,239,333 | 4/1941 | Mickle | 30—43.6 |
| 2,283,834 | 5/1942 | Van Dam et al. | 30—43.5 |
| 2,308,920 | 1/1943 | Horowitz et al. | 30—43.5 |
| 2,321,932 | 6/1943 | Nyhagen | 30—43.5 |
| 2,965,966 | 12/1960 | Jacobs | 30—43.5 |
| 3,220,108 | 11/1965 | MacCarthy | 30—34.2 |
| 3,298,101 | 1/1967 | MacCarthy | 30—43.5 |

MYRON C. KRUSE, *Primary Examiner.*